Jan. 26, 1937.  A. B. CADMAN  2,068,654
ELECTROMAGNETIC FRICTION DEVICE
Filed Dec. 10, 1934   2 Sheets-Sheet 1
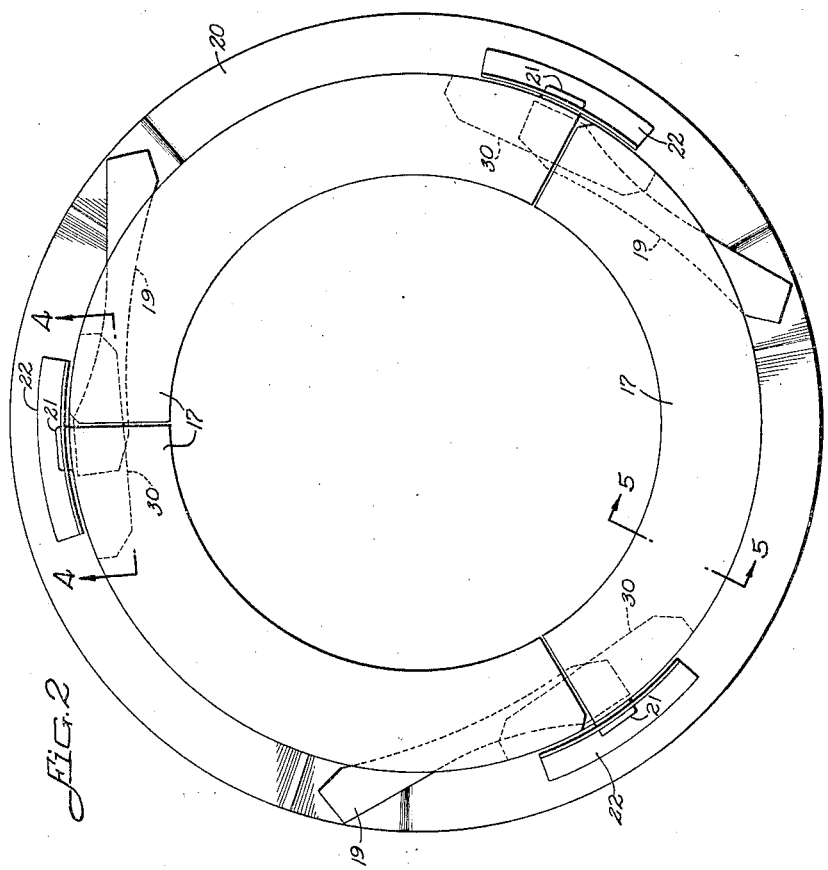
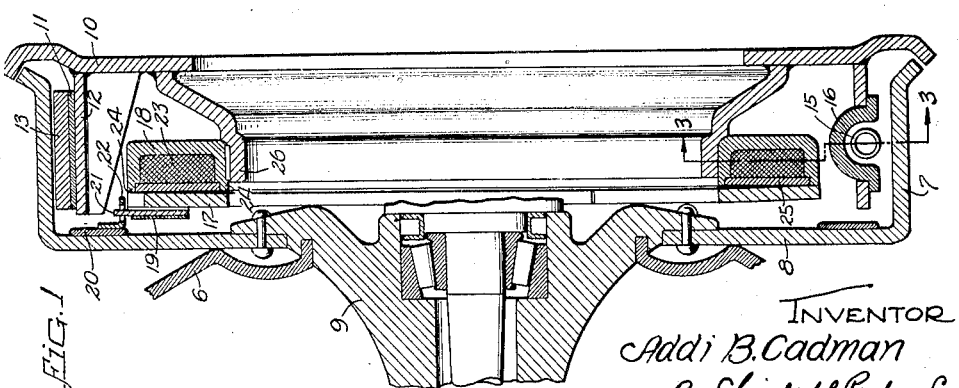
INVENTOR
Addi B. Cadman
By Chindall Parker + Carlen
ATTORNEYS Jan. 26, 1937.  A. B. CADMAN  2,068,654

ELECTROMAGNETIC FRICTION DEVICE

Filed Dec. 10, 1934  2 Sheets-Sheet 2

INVENTOR
Addi B. Cadman
By Chindahl, Parker, Carlson
ATTORNEYS

Patented Jan. 26, 1937

2,068,654

UNITED STATES PATENT OFFICE 2,068,654

ELECTROMAGNETIC FRICTION DEVICE

Addi B. Cadman, Beloit, Wis.

Application December 10, 1934, Serial No. 756,760

8 Claims. (Cl. 188—140)

This invention relates to electromagnetic friction devices for brakes and clutches, and more particularly to those in which a frictional force is derived by electromagnetic attraction between a substantially flat annular armature ring and the concentric pole faces of a second ring carrying an electromagnetic winding.

One object of the invention is to provide, in an electromagnetic friction device of the above character, a novel construction and mounting of the magnetic armature by which the detrimental effect of residual magnetism is eliminated effectually.

Another object is to provide an armature construction which is not subject to objectionable distortion under the heat developed during frictional engagement of the magnetic parts.

A further object is to provide a novel armature mounting by which an accurate relation between the energizing current and the attractive force of the magnetic rings may be obtained in initial manufacture without accurate machining of the coacting faces of the magnetic rings, which relation is maintained effectively through long periods of actual service use of the friction device.

Other objects and advantages of the invention will become apparent from the following detailed description taken in connection with the accompanying drawings, in which Figure 1 is a diametrical sectional view of an electric brake equipped with friction device embodying the features of the present invention.

Fig. 2 is a face view of the armature unit constructed in accordance with the present invention.

Figure 3:
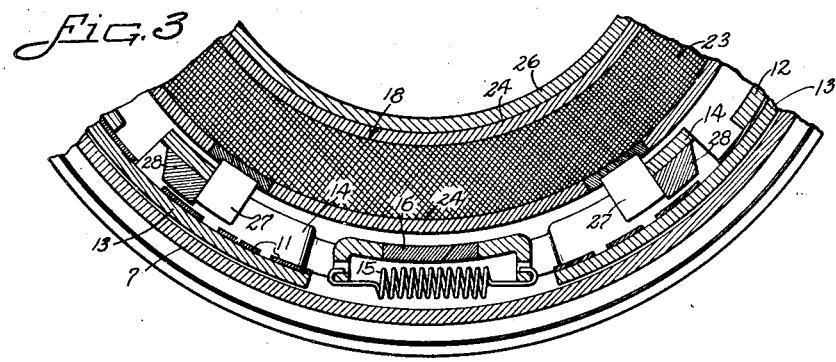
Fig. 3 is a fragmentary sectional view taken substantially along the line 3—3 of Fig. 1.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the drawings, the invention is embodied in an electric brake for a vehicle wheel 6 including a rotatable drum 7 having the usual flange 8 bolted or otherwise secured to the wheel hub 9. The inwardly opening end of the drum is closed by an annular plate 10 suitably secured to a non-rotatable support (not shown). The non-rotatable friction surface of the brake is of the band type comprising a metal strip 11 encircling inwardly projecting flange 12 on the anchor plate and carrying segments 13 of friction material. Fittings 14 are secured to the opposite ends of the strip 11 and drawn by a spring 15 into abutting engagement with the opposite end surfaces of a stop 16 rigid with the anchor plate.

The electromagnetic operator in which the present invention is embodied is utilized to spread the ends of the band apart and thereby set the brake. It comprises two rings 17 and 18 of magnetic material arranged concentric with the drum and adapted for axial gripping engagement. Preferably, the ring 17, which constitutes the magnetic armature, is substantially flat and of solid metal construction, being floatingly supported from the drum so as to rotate therewith and at the same time adapted for some degree of axial movement. To this end the back of the ring is secured at annularly spaced points to the ends of flexible metal strips 19 which extend in a substantially tangential direction and are rigid at their other ends with a ring 20 in turn riveted to the drum flange 8. The strips 19 are tensioned to urge the armature ring 17 away from the drum flange and thereby maintain the face of the ring in constant light mechanical contact with the face of the magnet 18. The strips act in tension to prevent relative rotation between the rings 17 and 20 in one direction. Relative rotation in the other direction is prevented by engagement between lugs 21 rigid with the armature and flanges 22 rigid with the ring 20.

The ring 18 constitutes a magnetic core and is U-shaped in cross section with a winding 23 disposed between and enclosed by its two concentric poles 24 and adapted to be energized from a storage battery or other source of electrical power. Plates 25 of non-magnetic material are mounted between the poles and provide a wear resisting surface substantially flush with the end faces of the poles and adapted to sustain the axial pressure between the two magnetic rings. The magnet ring is supported for oscillation about the drum axis by a circular flange portion 26 of the anchor plate.

Projecting rigidly from the outer magnet pole are two actuating lugs 27 having oppositely facing surfaces positioned to abut against lugs 28 which are rigid with the fittings 14 on the brake band. Upon movement of the magnet in either direction away from normal brake-released position (Fig. 3), one or the other of the lugs 27 will move its end of the brake away from the stop 16, thereby expanding the band and pressing its entire friction surface against the drum.

Such actuation of the band takes place whenever the winding 23 is energized with the wheel in motion. This produces a magnetic flux of high intensity in the closed magnetic circuit which encircles the winding through the opposite sections of the magnet core and armature. The resulting magnetic attraction causes gripping engagement between the friction surfaces of the two rings proportional to the strength of the energizing current, whereupon the magnet ring will be driven frictionally by the armature ring thereby moving with the wheel a short angular distance. In this circumferential movement, one end of the band is moved away from the stop 16 expanding the band and thereby pressing the segments 13 against the drum surface. After the normal clearance has been taken up, angular movement of the magnet ceases causing slippage between the ring surfaces in the continued rotation of the wheel. When the current flow is interrupted, the spring 15, acting through the medium of the fitting 14 and the lug 27 serves to restore the magnet as well as the actuated end of the band to normal brake-released position.

Inasmuch as the friction faces of the rings 17 and 18 are constantly urged into light mechanical contact by the springs 19 while the winding 23 is deenergized, it is unnecessary for the magnetic flux produced by the initial energization of the winding to overcome an air gap of any substantial width between the rings. As a result, the attractive force and, therefore, the degree of braking action is directly proportional to the strength of the energizing current.

A magnet of the character above described is capable of producing an extremely powerful attractive force when energized by a relatively low current owing to the extremely low reluctance of the magnetic flux circuit which encircles each circumferential section of the winding 23. For this reason, the residual magnetic field which inherently exists in the magnet core following such current interruption, tends to maintain the friction elements under some degree of gripping pressure. Such a persistent drag, if allowed to exist, would be particularly detrimental in a brake of the above character not only because of the light retarding action which it exerts on the wheel but because it subjects the magnetic elements to constant frictional wear and unnecessary heating.

The present invention contemplates elimination of the detrimental effects of residual magnetism by so constructing the armature 17 that one side edge thereof will, when the magnet is deenergized, be moved mechanically away from the coacting pole of the magnet thereby introducing in the magnetic circuit around the entire periphery of the magnet an air gap of dimensions sufficient to dissipate the residual magnetism instantaneously but not so wide as to prevent proper attraction of the magnetic parts upon the subsequent energization of the magnet. To this end, the armature ring is formed with a friction surface of slightly conical contour, the metal of the armature possessing sufficient resiliency to cause this conical curvature to be assumed and one side of the armature ring to spring away from the coacting magnetic pole when the magnet is deenergized.

Figure 4:
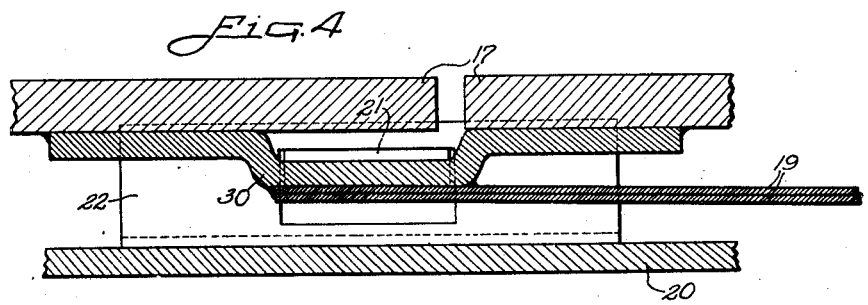
Fig. 4 is a sectional view taken along the line 4—4 of Fig. 2.

To permit of such action, the armature ring is formed in a plurality of structurally separate sections (see Fig. 2) which are mechanically connected by metallic strips 30 forming in effect a continuous ring structure but permitting of sufficient relative movement between the segments to enable them to be drawn down into firm contact with the face of the magnet when the latter is energized. As shown in Figs. 2 and 4, the strips 30 are located at the outermost edge of the armature segments, and their opposite ends are secured as by welding to the back of the adjacent segments. The spring strips 19, by which the armature ring is supported, are in turn secured as by welding to the strips 30.

Figure 5:
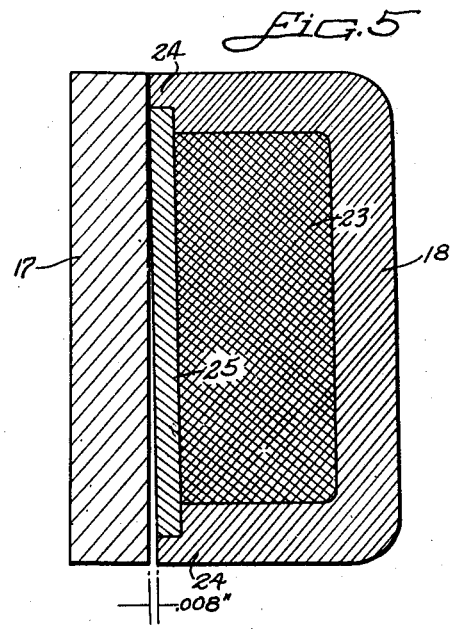
Fig. 5 is an enlarged sectional view taken along the line 5—5 of Fig. 2.

The coned surface of the armature ring may be formed by distorting the individual segments as in a pressing operation. The degree of coning is only a few thousandths of an inch across the face of the armature, being .008 of an inch in the present instance. With the armature thus constructed, it will be seen from Fig. 5 that the inner edge of the segments 17 will be spaced a small distance from the inner magnet pole whenever the magnet is deenergized. When current is applied to the winding 23, the resulting attractive force produced will distort the segments 17 sufficiently to draw their inner edges into firm mechanical contact with the magnet face and against the inner pole face. With the segments thus stressed, it will be apparent that they will tend to assume their coned condition upon deenergization of the magnet so that as soon as the current to the winding 23 is interrupted, the inner edges of the segments will spring away from the inner magnet pole and thereby introduce around the entire magnetic circuit a non-magnetic gap of sufficient width to dissipate the residual magnetism. This action will continue throughout the service life of the friction device.

The segmental armature construction above described is also advantageous in that it possesses sufficient flexibility to allow the armature to adapt itself to the magnet surface in spite of distortion thereof which may occur in joining the parts together or under the heat incident to the service use of the device. Thus, it has been found to be unnecessary to grind the face of the armature ring 17 after the ring and its supporting elements have been assembled. In addition, magnet and armature units may be constructed which will therefore produce the same consistent action in the friction device when energized by a given current.

I claim as my invention:

1. An electromagnetic friction device combining a magnet ring having two concentric pole faces disposed in a plane perpendicular to the ring axis, an annular winding carried by said ring and disposed between said poles, and a second ring of magnetic material adapted to be brought into frictional gripping engagement with said first ring and overlying said poles so as to form a magnetic flux circuit encircling all sections of said winding, said second ring comprising relatively movable sections adapted to lie flat against the face of the magnet when the latter is energized but stressed to spring away from one of said pole faces and define a conical surface when the magnet is deenergized.

2. An electromagnetic friction device combining a magnet ring having two concentric pole faces disposed in a plane perpendicular to the ring axis, a winding carried by said ring and disposed between said poles, and a second ring of magnetic material adapted to be brought into frictional gripping engagement with said first ring and overlying said poles so as to form a magnetic flux circuit encircling all sections of said winding, said second ring being composed of relatively movable sections and the surfaces thereof overlapping said pole faces having a slightly conical contour.

3. For use in an electromagnetic friction device, an armature ring comprising a plurality of flat metal segments arranged in end to end relation and defining an annular friction face of slightly conical contour, and means on the side of said segments opposite said face connecting the sections together to form a unitary ring while permitting relative flexing of the sections to bring all points of said friction surface into a common plane.

4. An electromagnetic friction device comprising, in combination, a magnet ring carrying a winding and having two concentric pole faces disposed in a plane perpendicular to the ring axis, and a coacting armature ring composed of relatively movable segments defining a friction face overlapping said pole faces and having a conical contour such that the armature is disposed further from the inner than from the outer pole face when said winding is deenergized.

5. An electromagnetic friction device comprising, in combination, a magnet ring carrying a winding and having two concentric pole faces disposed in a plane perpendicular to the ring axis, a coacting armature ring having a friction face overlapping said pole faces and tiltable relative to the latter by mechanical action when the magnet ring is deenergized whereby to introduce an air gap between the armature ring and one of said pole faces, and means operating while the magnet is deenergized to maintain mechanical contact between the rings at points adjacent the other pole face.

6. An electromagnetic friction device comprising, in combination, a magnet ring carrying a winding and having two concentric pole faces disposed in a plane perpendicular to the ring axis, a coacting armature ring having a friction face overlapping said pole faces and arranged to be tilted mechanically relative to said magnet ring in a direction to introduce an air gap between the armature and the inner one of said pole faces, and means acting while the magnet is deenergized to maintain the armature ring substantially in contact with the outer pole face.

7. For use in an electromagnetic friction device, an armature ring comprising a plurality of flat metal segments arranged in end to end relation and defining an annular friction face of slightly conical contour, and metal strips connecting the adjacent ends of said segments and disposed adjacent one side edge of the segments.

8. An electromagnetic friction device comprising a magnet and an armature therefor having cooperating annular faces, said armature comprising a plurality of segmental sections and metal strips joining the adjacent ends of said sections to form a substantially rigid unitary structure while permitting of some degree of relative flexibility between the sections.

ADDI B. CADMAN.